United States Patent
Climent

(10) Patent No.: US 8,242,436 B2
(45) Date of Patent: Aug. 14, 2012

(54) NEUTRON POROSITY LOGGING TOOL USING MICROSTRUCTURED NEUTRON DETECTORS

(75) Inventor: Helene Claire Climent, Sugar Land, TX (US)

(73) Assignee: Sondex Limited, Yately, Hampshire (GB)

( * ) Notice: Subject to any disclaimer, the term of this patent is extended or adjusted under 35 U.S.C. 154(b) by 0 days.

(21) Appl. No.: 12/956,560

(22) Filed: Nov. 30, 2010

(65) Prior Publication Data

US 2012/0132819 A1 May 31, 2012

(51) Int. Cl.
*G01V 5/10* (2006.01)
(52) U.S. Cl. .................................. 250/269.4
(58) Field of Classification Search .......... 250/253–268, 250/269.1–269.8
See application file for complete search history.

(56) References Cited

U.S. PATENT DOCUMENTS

| | | | |
|---|---|---|---|
| 3,942,004 A | 3/1976 | Kehler | |
| 4,005,290 A | 1/1977 | Allen | |
| 4,021,666 A | 5/1977 | Allen | |
| 4,423,323 A * | 12/1983 | Ellis et al. | 250/264 |
| 5,345,077 A * | 9/1994 | Allen et al. | 250/264 |
| 7,164,138 B2 * | 1/2007 | McGregor et al. | 250/390.01 |
| 7,301,223 B2 | 11/2007 | Rodney et al. | |
| 2008/0047751 A1 | 2/2008 | Yamate | |
| 2010/0193675 A1 * | 8/2010 | Stoller | 250/254 |

OTHER PUBLICATIONS

D.S. McGregor et al., "Microstructured Semiconductor Neutron Detectors," Nuclear Instruments and Methods in Physics Research A, 2009, pp. 1-7.
Rebecca J. Nikolic et al., "Pillar Structured Thermal Neutron Detector," "978-1-4244-2186-2/08," copyrighted 2008, IEEE.

* cited by examiner

*Primary Examiner* — Kiho Kim
(74) *Attorney, Agent, or Firm* — Potomac Patent Group PLLC

(57) ABSTRACT

A neutron porosity measurement device uses semiconductor detectors located at different distances from a cavity configured to accommodate a neutron source. Each of the semiconductor detectors includes (i) a semiconductor substrate doped to form a pn junction, and having microstructures of neutron reactive material formed to extend from a first surface inside the semiconductor substrate, and (ii) electrodes, one of which is in contact with the first surface of the semiconductor substrate and another one of which is in contact with a second surface of the semiconductor substrate, the second surface being opposite to the first surface. The electrodes are configured to acquire an electrical signal occurring when a neutron is captured inside the semiconductor substrate.

20 Claims, 6 Drawing Sheets

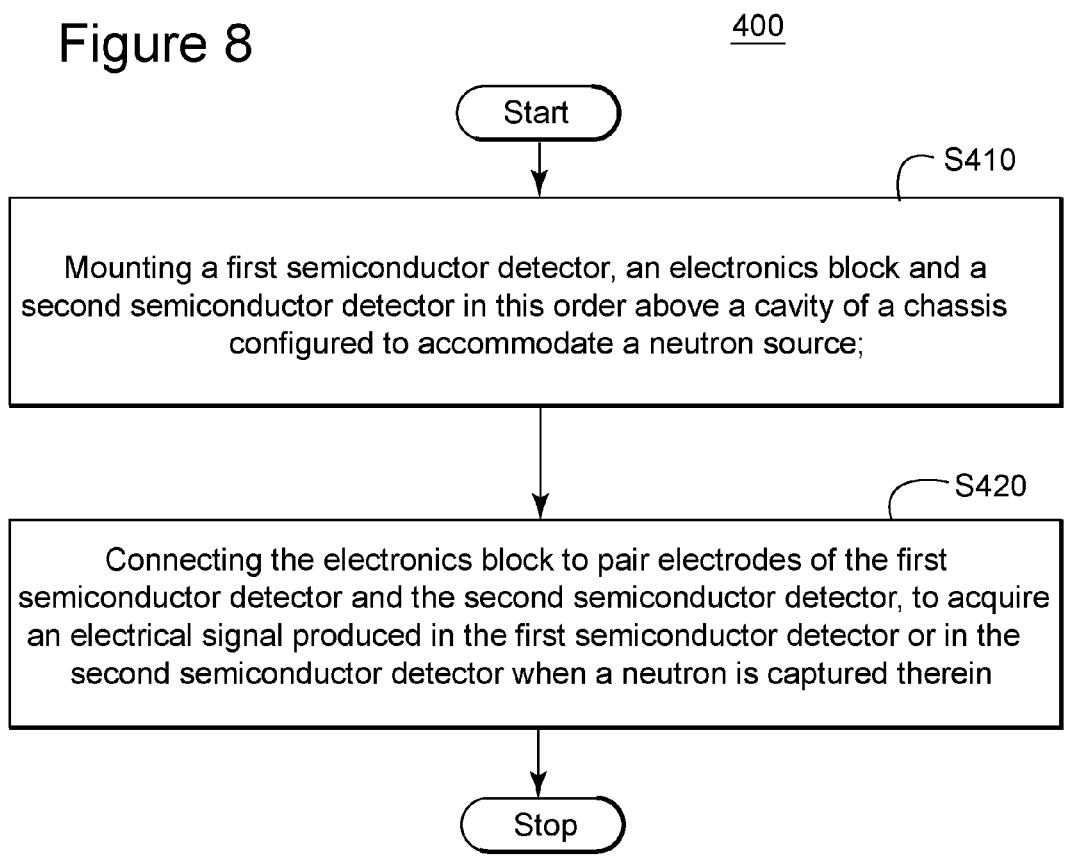

NEUTRON POROSITY LOGGING TOOL USING MICROSTRUCTURED NEUTRON DETECTORS

BACKGROUND

1. Technical Field

Embodiments of the subject matter disclosed herein generally relate to methods and tools used to measure formation porosity in oil and gas industry, more particularly, to methods and tools using microstructured semiconductor neutron detectors.

2. Discussion of the Background

In the oil and gas industry, formation porosity is measured to identify oil and gas reserves. Although other techniques may be employed to determine formation porosity (e.g., sonic and Nuclear Magnetic Resonance), the porosity measurements using neutrons is the most frequent.

Down-hole neutron-porosity tools may be wireline or logging (or measuring) while drilling (LWD/MWD). The principal difference between LWD and wireline tools is the service environment. LWD tools operate during the drilling process and are subjected to the high levels of vibration and shock generated by drilling through rock. Wireline tools are conveyed in and out of the borehole on a cable after drilling, and, therefore, do not experience shock and vibration. In both cases, the tool operates at temperatures as high as 175° C. sometimes higher.

As illustrated in FIG. 1, down-hole porosity measurements are performed using a neutron source 10 and two detectors or arrays of detectors, a "near" neutron detector 20 and a "far" neutron detector 30, which are located at different distances from the neutron source 10. The neutron source 10 and the neutron detectors 20 and 30 are usually encapsulated in a chassis 40. The chassis 40 is lowered in a borehole 50 that penetrates a soil formation 60. Some of the neutrons emitted by the neutron source 10 towards the soil formation 60, loose energy (i.e., are "thermalized") and are deflected towards the neutron detectors 20 and 30 due to collisions or interactions with nuclei in the formation 60.

The detectors 20 and 30 detect some (depending on each detector's efficiency) of these neutrons with lower (thermal) energy. The ratio of the counting rates (i.e., number of detected neutrons/time) in the two detectors 20 and 30 is directly related to the porosity of the formation 60.

The probability of an interaction of a neutron and a nucleus (i.e., a nuclear reaction) can be described by a cross-section of the interaction (i.e., reaction). A detector's efficiency is proportional with the probability of an interaction occurring when a neutron enters the detector's volume. The neutron detectors are built based on the large probability (i.e., cross-section) of a thermal neutron being captured (i.e., interact/react) with three nuclei: helium ($^3$He), lithium ($^6$Li) and boron ($^{10}$B). Other particles such as, the α particle ($_2^4\alpha$) and the proton ($_1^1$p) result from the reaction of the thermal neutron with these elements. A calculable amount of energy (Q) is emitted as a result of the neutron capture reaction. This emitted energy may be kinetic energy of the resulting particles or gamma rays. The energy is dissipated by ionization, that is, formation of pairs of electron and positively charged particle. These pairs can be collected, for example, in an electrical field, and, thus, generate a signal recognizable as a signature of the neutron capture reaction. The larger is the emitted energy, the larger is the amplitude of the signature signal.

Some other particles (e.g., gamma rays) besides the targeted neutrons may cross the detector simultaneously. A good detector should exhibit characteristics that would allow discrimination between capture of a thermal neutron and other untargeted nuclear reactions that may occur. To facilitate discrimination between a neutron capture reaction and a gamma ray, the energy emitted in the neutron capture reaction (Q) should be as high as possible.

The three most common neutron capture reactions used for neutron detection are illustrated in Table 1:

TABLE 1

| Name | Reaction | Q (MeV) | Thermal neutron cross section (barns) |
|---|---|---|---|
| $^{10}$B(n, α) | $_5^{10}$B + $_0^1$n → $_3^7$Li + $_2^4\alpha$ | Ground 2.792 Excited 2.31 | 3840 |
| $^6$Li(n, α) | $_3^6$Li + $_0^1$n → $_1^3$H + $_2^4\alpha$ | 4.78 | 940 |
| $^3$He(n, p) | $_2^3$He + $_0^1$n → $_1^3$H + $_1^1$p | 0.764 | 5330 |

In the above table, relative to the $^{10}$B(n,α) reaction "Ground" means that the resulting $_3^7$Li is in a ground state and "Excited" means that the resulting $_3^7$Li is in the first excited state.

Traditionally, detectors based on $^3$He(n,p) reaction have been used in neutron porosity measurements performed in the oil and gas industry, due to their relatively low cost, ruggedness, good detection efficiency, and insensitivity to gamma rays (i.e., the cross section for an interaction of the gamma ray with $^3$He is very small). The detection efficiency of these $^3$He based detectors can be improved by using higher pressures of the $^3$He gas, but the use of higher pressures results in increasing the cost of the detectors and of the high voltage required to operate them, which adversely affects the associated detector electronics. Additionally, the critical worldwide shortage of $^3$He makes it necessary to develop alternate neutron detectors for neutron porosity measurements in the oil and gas industry.

Lithium-glass scintillation detectors are currently used in some logging tools. The detection efficiency of the detectors based on $^6$Li(n,α) reaction depends on the amount of $^6$Li in the detector material. A common lithium-glass used for down-hole logging is GS20, which has an isotopic ratio of 95% $^6$Li and a total lithium composition of 6.6%. Although the cross section for an interaction of the gamma ray with $^6$Li is significant, the large amount of energy (Q) resulting from the $^6$Li(n,α) reaction enables a reasonable discrimination from reactions induced by gamma rays. However, the poor energy resolution of lithium-glass detectors at room temperature diminishes further at temperatures as low as 150° C., rendering their use limited to relatively shallow wells. In the lithium-glass scintillation detectors, the lithium-glass is coupled to a photomultiplier tube (PMT) that introduces electronic noise at elevated temperatures and is mechanically fragile.

Accordingly, it would be desirable to provide neutron detectors having a good detection efficiency (i.e., large cross section for neutron capture), good discrimination relative to gamma rays, and can be used in the logging shock and vibration environment (e.g., during drilling) and at high temperatures (e.g., over 175° C.).

SUMMARY

According to one exemplary embodiment, a neutron porosity measurement device includes a cavity configured to receive a neutron source that emits neutrons, a first semiconductor detector located at a first distance from the cavity, and a second semiconductor detector located at a second distance larger than the first distance from the cavity. Each of the first and the second semiconductor detector includes a semiconductor substrate doped to form a pn junction, and having microstructures of neutron reactive material formed to extend from a first surface inside the semiconductor substrate, and electrodes, one of which is in contact with the first surface of the semiconductor substrate and another one of which is in contact with a second surface of the semiconductor substrate, the second surface being opposite to the first surface, the electrodes being configured to acquire an electrical signal occurring when a neutron is captured inside the semiconductor substrate.

According to one exemplary embodiment, a neutron porosity measurement tool includes (i) a neutron source that emits neutrons, (ii) a first semiconductor detector located at a first distance from the neutron source, (iii) a second semiconductor detector located at a second distance larger than the first distance from the neutron source, (iv) an electronics block configured to receive electrical signals from the first semiconductor detector and from the second semiconductor detector, and (v) a chassis configured to accommodate the neutron source, the first semiconductor, the electronics block and the second semiconductor detector. Each of the first and the second semiconductor detector includes a semiconductor substrate doped to form a pn junction, and having microstructures of neutron reactive material formed to extend from a first surface inside the semiconductor substrate, and electrodes, one of which is in contact with the first surface of the semiconductor substrate and another one of which is in contact with a second surface of the semiconductor substrate, the second surface being opposite to the first surface, the electrodes being configured to acquire and transmit to the electronics block, an electrical signal occurring when a neutron is captured in the semiconductor substrate.

According to another exemplary embodiment, a method of manufacturing a neutron porosity measurement device includes mounting a first semiconductor detector, an electronics block and a second semiconductor detector in this order along a chassis, above a cavity of the chassis configured to accommodate a neutron source. The method further includes connecting the electronics block to pairs of electrodes of the first semiconductor detector and of the second semiconductor detector, to acquire electrical signals produced in the first semiconductor detector and in the second semiconductor detector when a neutron is captured therein.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 8 is a flow chart of a method of manufacturing a neutron porosity measurement device using semiconductor based neutron detectors according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of neutron detection tools used for measuring the porosity of soil formations in oil and gas industry. However, the embodiments to be discussed next are not limited to these systems, but may be applied to other systems that require neutron detection in the context of scarcity of $^3$He.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Neutron semiconductor detectors consist of a pn junction diode made of semiconductor microstructured with an etched pattern and filled with neutron reactive material. The pn junction is manufactured by doping the semiconductor substrate (1) with impurities having more than four electrons on its outer electron shell, on one side of the semiconductor substrate, and (2) with impurities having less than four electrons on its outer electron shell or on one side of the semiconductor substrate. Doping the semiconductor substrate in this manner determines occurrence of an electric field inside the semiconductor structure. The electric field favors a movement of free positively charged particles towards one surface of the semiconductor substrate and a movement of free negatively charged particles towards an opposite surface of the semiconductor. Thus, one advantage of the neutron semiconductor detector is that, in contrast with the $^3$He and Lithium-glass detectors, no applied electric field is necessary for detecting a signal due to collecting the free charged particles generated after a neutron capture, at the electrodes.

Figure 1:
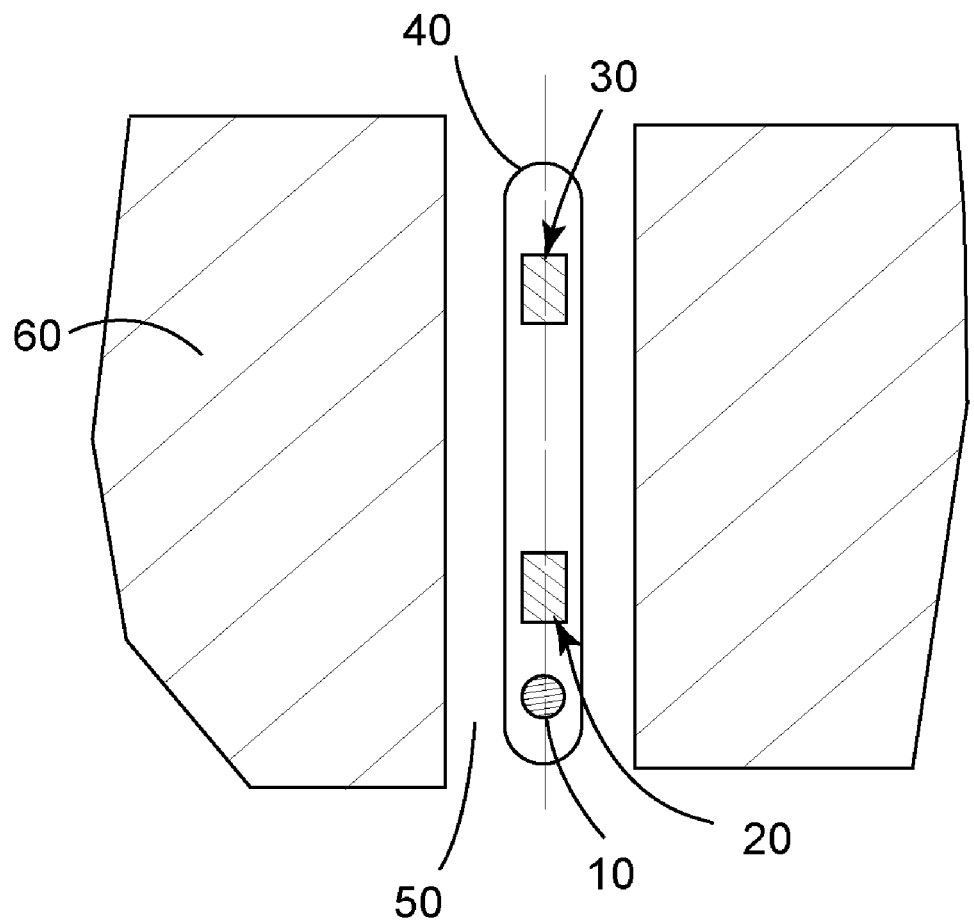
FIG. 1 is a schematic diagram of a neutron detection tool.
Figure 2:
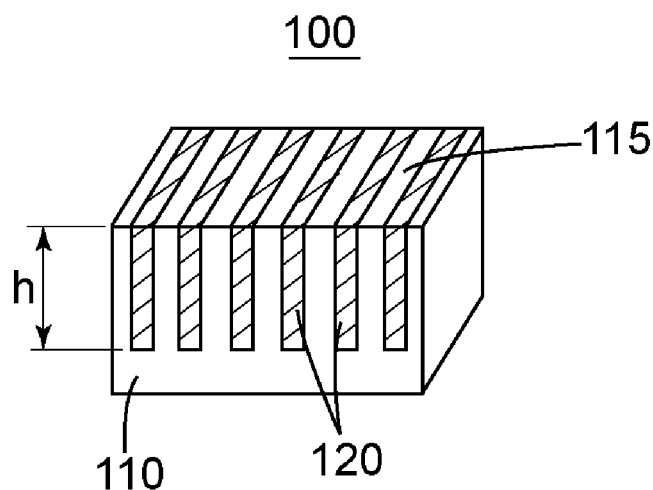
FIG. 2 is a schematic diagram of a neutron semiconductor detector according to an exemplary embodiment.

FIG. 2 illustrates a neutron semiconductor detector 100 made of a semiconductor 110 (p+ and n+ illustrate the presence of impurities in the semiconductor 110) with thin film microstructures of neutron reactive material 120 formed to extend from a first surface 115. The neutron reactive material 120 may include $^{10}$B or $^6$Li (e.g., LiF). The semiconductor 110 may be silicon carbide (SiC). In FIG. 2, the neutron reactive material 120 is inserted in trenches inside the semiconductor material 110. In a part of the semiconductor 110 where the neutron reactive material is inserted in trenches, a neutron reactive material concentration by volume may be about 50% of the total volume. In an alternative embodiment illustrated in FIG. 3, a neutron semiconductor detector 101 is inserted in holes, the neutron reactive material 120 forming pillars inside the semiconductor material 110. In a part of the semiconductor 110 where the neutron reactive material is inserted in the holes, a neutron reactive material concentration by volume may be about 12% of the total volume. In trenches or pillars, the neutron reactive material 120 having a thickness h penetrates inside the semiconductor 110. The thickness h ranges from tens of micrometers up to a few hundreds of micrometers.

Figure 3:
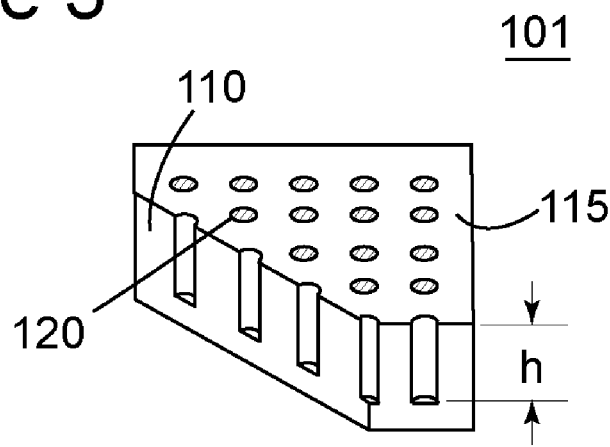
FIG. 3 is a schematic diagram of a neutron semiconductor detector according to another exemplary embodiment.
Figure 4:
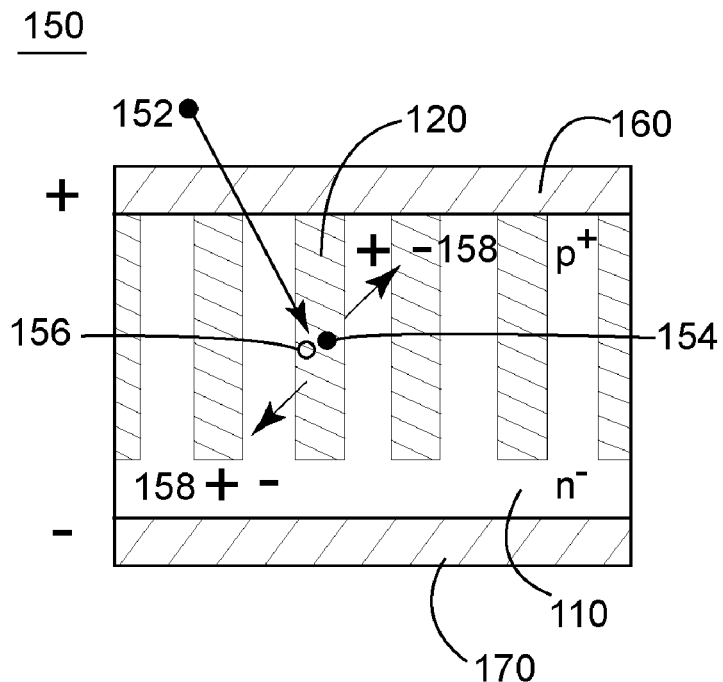
FIG. 4 is an illustration of a neutron detection in a neutron semiconductor detector according to an exemplary embodiment.

FIG. 4 illustrates the detection of a neutron in a neutron semiconductor detector 150 (e.g., 100 in FIG. 2 or 101 in FIG. 3). An incoming thermal neutron 152 interacts with a $^6$Li nucleus 154 inside the neutron reactive material 120. The α-particle 156 and the recoiled nucleus 154 resulting from the interaction generates pairs 158 of free electrons and missing electron holes (behaving like free positively charged particles) in the semiconductor 110. The electrons and the holes migrate to the top or the bottom of the structure due to the electric field in the semiconductor pn junction. The electric field in the semiconductor due to the doping may be amplified by an electric field applied via electrodes 160 and 170. The electrodes 160 and 170 may be made of gold. The electrodes 160 and 170 allow acquiring and transmitting an electrical signal due to the free charged particles formed after a neutron is captured.

Figure 5:
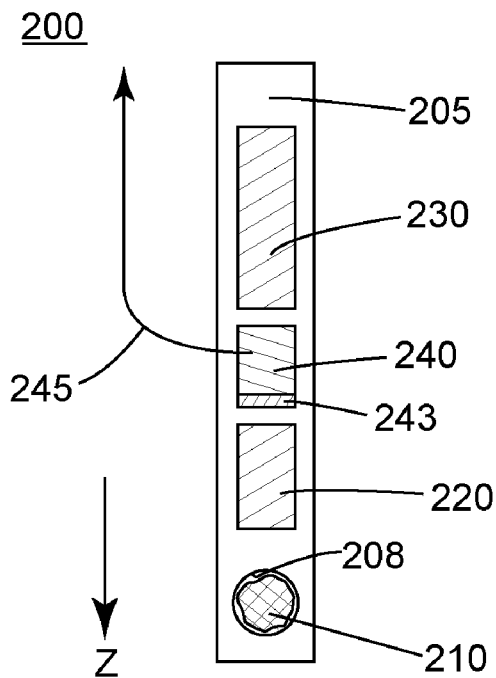
FIG. 5 is a schematic diagram of a neutron porosity measurement device using neutron semiconductor detectors according to an exemplary embodiment.

Neutron semiconductor detectors as described above are used in a neutron porosity measurement device 200 illustrated in FIG. 5. A chassis 205 includes at a cavity 208 in a lower part of the chassis 205. The cavity 208 is configured to receive a fast neutron source 210. Due to the potential harmful effects of human exposure to neutron radiation, chemical neutron sources are usually stored in safe containers when not used and mounted only shortly before the tool is lowered in the borehole for measurement. Here, "up" and "down", "top" and "bottom", "above" and "beneath" correspond to the illustration in FIG. 5, which illustrates the orientation of the chassis 205 as lowered in the borehole, in z direction. The neutron source 210 may be a chemical source such as AmBe or an electrical neutron generator. The chassis 205 may be made of stainless steel.

The neutrons emitted by the neutron source are thermalized or slowed down in the formation and in the borehole. The slowdown and scattering of the neutrons towards the detectors in the formation is the effect that makes possible evaluating the formation porosity. The slowdown and scattering occurring in the borehole is an undesired effect, which makes it necessary to apply a correction, known as the borehole correction to the measurement results. Other corrections applied while processing the porosity measurement results include (but are not limited to): mud weight, temperature, pressure, standoff from the borehole wall, etc.

A "near" semiconductor detector 220 is located in the chassis 205, above the neutron source 210. For example, the near semiconductor detector 220 may be located around 5" away from the neutron source 210. A "far" semiconductor detector 230 is located in the chassis 205, above the neutron source 210 and the "near" semiconductor detector 220. For example, the far semiconductor detector 230 may be located around 15" away from the neutron source 210. The neutron source 210 and the semiconductor detectors 220 and 230 may be mounted coaxially. An average energy of neutrons emitted by the neutron source is substantially larger than an average energy of neutrons detected in the semiconductor detectors 220 and 230. Fast neutrons, having for example energies larger than 1 MeV, are less likely to interact with nuclei due to neutrons' high speeds. Thermal neutrons with energies less than 1 eV are more likely captured by nuclei. Therefore, an average energy of neutrons emitted by the neutron source is substantially larger than an average energy of neutrons detected in the semiconductors.

Between the near semiconductor detector 220 and the far semiconductor detector 230 in the chassis 205 may be located an electronics block 240. The electronics block 240 may include a measurement data processing unit 243 configured to collect and process data (e.g., electrical signals) from the semiconductor detectors 220 and 230. The data processing unit 243 may be configured to count a number of electrical signals received from the semiconductor detector 220 and a number of electrical signals received from the semiconductor detector 230, during a predetermined time interval, and to perform a number of corrections before estimating the formation porosity based on a ratio of these numbers. Thus, the electronics block 240 may determine and compare counting rates for each of the neutron semiconductor detectors 220 and 230. In an alternative embodiment, the electronics block 240 may include a memory configured to store data related to the porosity measurement, in order to retrieve and process the data after the device is brought up at the surface.

The electronics block 240 may also be configured to transmit data and or results related to the porosity measurement to a remote device via a wire 245 or wirelessly. Although the wire 245 is illustrated outside the chassis 205, the wire may be contained inside the chassis 205 and may extend along a line (cable) used for lowering the tool inside the borehole. Further, since the neutron semiconducting detectors operate reliably at temperatures up to 250° C., the electronics block 240 may be designed and built to operate at the same temperatures. If the neutron porosity measurement device 200 is used while drilling (i.e., Logging While Drilling LWD, or Measuring While Drilling MWD), porosity measurement related data may be sent at the surface through the mud (in a real-time mode) and/or recorded in a data storage device (in a recording mode) to be recovered and processed after the device is brought back to the surface.

Conventional porosity logging tools using $^3$He or Lithium-glass detectors require a high voltage power supply to be able to collect a signal when a neutron is captured. The high voltage power supply takes up a lot of space inside the conventional porosity logging tool. In case of the neutron porosity measurement device 200, no power supply is necessary due to the pn junction's electric field (although an enhancing electric field may be applied without a high power requirement). Since the neutron semiconductors detectors do not require a (high) power supply, the electronics block is smaller compared to that of a helium tube or the photomultiplier required with lithium-glass. If a chassis used for a conventional tool is used with neutron semiconductor detectors, the freed space may be filled with a neutron absorber (boron epoxy, for example) to better shield the neutron detectors from the neutron source, and, thus, to lower the number of detected neutrons that do not travel through the formation. In other words, more shielding results in reducing noise of the measurement. Alternatively, the electronics block being smaller allows the chassis to be smaller than the chassis used for a conventional tool.

The detection efficiency of different types of detectors has been compared using simulations using the MCNP code. The MCNP code is a Monte Carlo N-particle Transport Code software developed for simulating nuclear processes. The shape of the detectors used in the simulation are based on exiting helium tube and lithium-glass detectors, all the compared detectors having a cylindrical shape of 0.5" diameter and 1" length and being placed inside a chassis having an outer diameter of 4" and a length of 48". The sizes of the detectors of the exemplary embodiments may vary from these numbers and may be adjusted through modeling to provide a neutron porosity device capable to provide optimal performance in the context for which it is designed. In these simulations, the surrounding formation was considered for a depth of 71" (outer diameter) and a length of 48". The characteristics of the materials used in this simulation are summarized in Table 2. These materials and numbers are exemplary and not intended to limit the embodiments.

TABLE 2

| Detector | Material |
| --- | --- |
| Helium tube | 10 atm. Pressure $^3$He gas, 0.00134 g/cm$^3$ |
| Lithium-glass | KG2, isotopic ratio 95%, Total Lithium 7.5%, 2.42 g/cm$^3$ |
| SiC$^{10}$B pillar | 87.44% SiC, 12.56% $^{10}$B, 2.6736 g/cm$^3$ |
| SiC$^{10}$B trench | 50% SiC, 50% $^{10}$B, 2.8930 g/cm$^3$ |
| SiC$^6$Li pillar | 87.44 SiC, 12.56% $^6$Li, 0.8636 g/cm$^3$ |
| SiC$^6$Li trench | 50% SiC, 50% $^6$Li, 1.8580 g/cm$^3$ |
| Chassis | Stainless steel - 15/5, 7.850 g/cm$^3$ |
| Formation | Limestone 15.6 pu filled with fresh water, 2.1398 g/cm$^3$ |

The efficiency of the simulated detectors is determined as the ratio between a captured neutron in the detector and the total number of neutrons entering the detectors. The trenches and pillars of neutron reactive material of the neutron semiconductor detectors are 50 μm deep. The results are summarized in Table 3.

TABLE 3

| Detector | Efficiency % | Relative efficiency |
| --- | --- | --- |
| Helium tube | 2.51 | |
| Lithium-glass | 6.67 | 2.66 |
| SiC$^{10}$B pillar | 4.34 | 1.73 |
| SiC$^{10}$B trench | 3.26 | 1.30 |
| SiC$^6$Li pillar | 0.9 | 0.36 |
| SiC$^6$Li trench | 0.54 | 0.22 |

The simulations revealed that neutron semiconductor detectors with $^{10}$B as reactive material have a higher efficiency than the ones with $^6$Li as reactive material for the same dimensions which is expected as the cross-section of $^{10}$B is larger than the one of $^6$Li.

Figure 6:
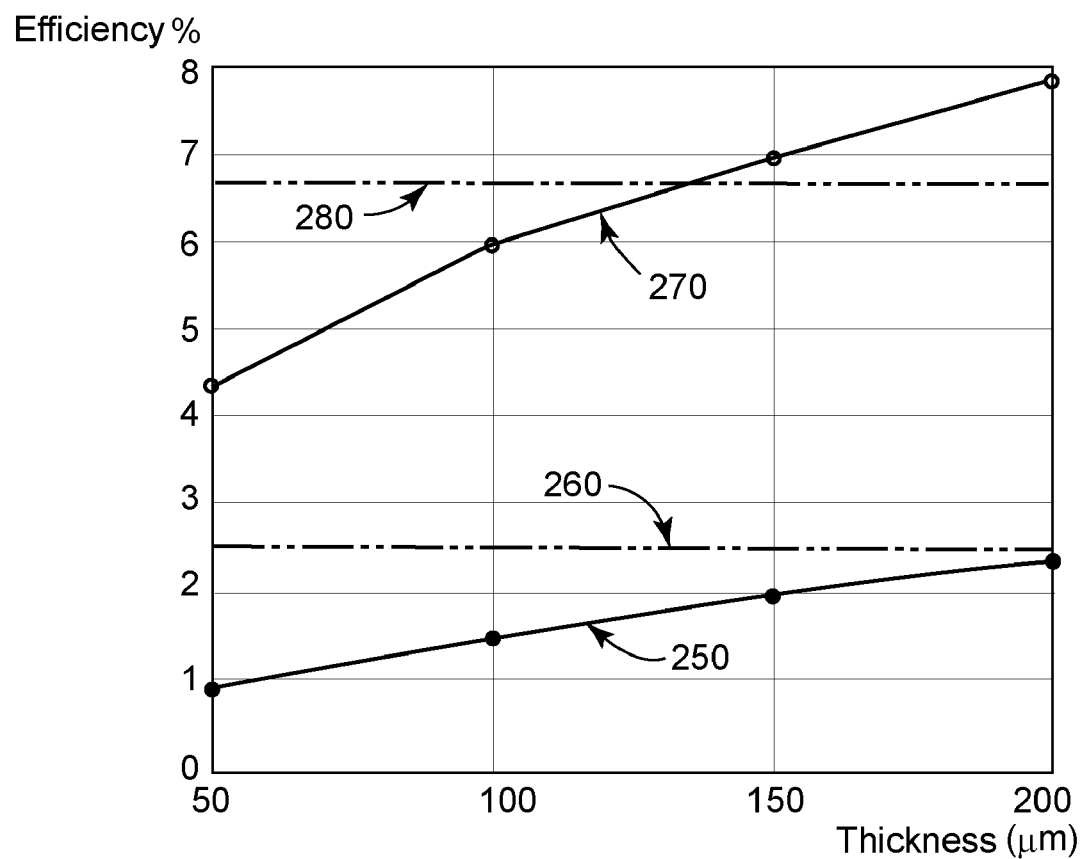
FIG. 6 is a graph illustrating the detection efficiency dependence of the thickness of the reactive material in the semiconductor material, according to various embodiments.

Further simulations for pillars of neutron reactive material having various depths in the semiconductor material, i.e., between 50 μm and 200 μm for a step of 50 μm, revealed that (i) at 200 μm depth of the pillars, the efficiency of the SiC$^6$Li detectors becomes comparable with the helium tube efficiency, and for depths of the pillars over 130 μm the SiC$^{10}$B detectors efficiency becomes larger than the lithium-glass efficiency. The results are summarized in FIG. 6 in which the x-axis is the pillar's thickness in μm, on y-axis is the detection efficiency in %, line 250 corresponds to the SiC$^6$Li detector, line 260 corresponds to the helium tube, line 270 corresponds to the SiC$^{10}$B detector and line 280 corresponds to the lithium-glass detector. The trench configuration for both SiC$^{10}$B and SiC$^6$Li follow a similar trend since the reactive material concentration increases with its thickness.

Figure 7:
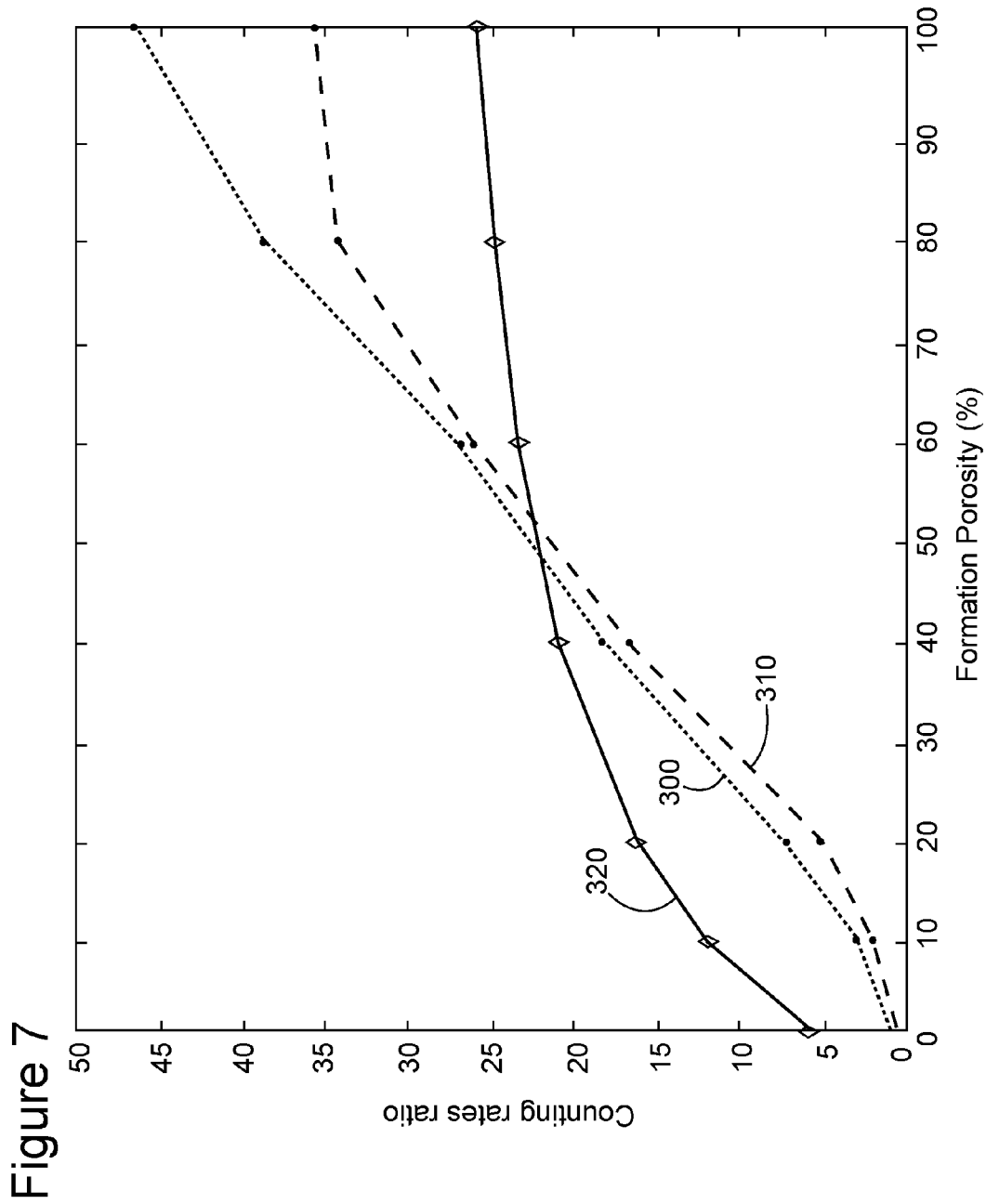
FIG. 7 is a graph illustrating a ratio of counting rates relative to porosity of the soil formation, according to exemplary embodiments.

The simulations also allowed an evaluation of the ratio of the counting rates of the near and far detectors for the SiC$^{10}$B detector, the SiC$^6$Li detector, and the helium tube as functions of the porosity of the formation. In FIG. 7, the x-axis is the porosity in percentage, and the y-axis is the ratio of the counting rates for the different neutron detectors. Line 300 in FIG. 7 corresponds to the SiC$^{10}$B detector in pillar configuration, line 310 to the SiC$^6$Li detector in pillar configuration, and line 320 to the helium tube. The slope of the curves being larger for the neutron semiconductor detectors than for the helium tube over 20% porosity means that the sensitivity of the porosity measurement is larger when using the neutron semiconductor detectors than when using the helium tube.

These simulation results have confirmed that the neutron semiconductor detectors can be built to match and exceed the detection performance (efficiency and sensitivity) of currently used detectors (with $^3$He and lithium-glass). Additionally, the neutron semiconductor detectors can operate reliably at temperatures up to 250° C. and higher.

A flow chart of a method 400 of manufacturing a neutron porosity measurement device is illustrated in FIG. 8. The method 400 includes mounting a neutron source, a first semiconductor detector, an electronics block and a second semiconductor detector in this order along a chassis, at S410. The method 400 further includes connecting the electronics block to pairs of electrodes of the semiconductor detectors, to provide a potential difference to each pair of electrodes and to acquire electrical signals produced in the semiconductor detectors when a neutron is captured therein, at S420. The method 400 may further include, after S410 and S420, attaching the chassis to a drill line.

The disclosed exemplary embodiments provide devices and methods related to porosity measurements using neutron semiconductor detectors. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:
1. A neutron porosity measurement device, comprising:
a cavity configured to receive a neutron source that emits neutrons;
a first semiconductor detector located at a first distance from the cavity;
a second semiconductor detector located at a second distance larger than the first distance from the cavity,
wherein each of the first and the second semiconductor detector includes
a semiconductor substrate doped to form a pn junction, and having microstructures of neutron reactive material formed to extend from a first surface inside the semiconductor substrate, and
electrodes, one of which is in contact with the first surface of the semiconductor substrate and another one of which is in contact with a second surface of the semiconductor substrate, the second surface being opposite to the first surface, the electrodes being con- figured to acquire an electrical signal occurring when a neutron is captured inside the semiconductor substrate; and an electronics block located between the first semiconductor detector and the second semiconductor detector and configured to receive the electrical signal from the electrodes, wherein no high power source is included to provide an electric field across the first semiconductor detector and/or to the second semiconductor detector, a space between the first semiconductor detector and the second semiconductor detector, except for the electronics block, being filled with a neutron absorber.

2. The neutron porosity measurement device of claim 1, wherein the electronics block is configured to count a number of electrical signal received from the first semiconductor detector and a number of the electrical signal received from the second semiconductor detector in a predetermined time interval.

3. The neutron porosity measurement device of claim 2, wherein the electronics block is configured determine a ratio of the number of the electrical signal received from the first semiconductor detector and the number of the electrical signal received from the second semiconductor detector in the predetermined time interval.

4. The neutron porosity measurement device of claim 2, further comprising at least one of:
a memory configured to store data including the number of electrical signal received from the first semiconductor detector and the number of the electrical signal received from the second semiconductor detector in the predetermined time interval, for a sequence of intervals; and
a processing unit configured to calculate a porosity value based on a ratio of the number of the electrical signal received from the first semiconductor detector and the number of the electrical signal received from the second semiconductor detector in the predetermined time interval.

5. The neutron porosity measurement device of claim 1, wherein the electronics block is configured to supply a low power potential difference to the electrodes and the electrodes are configured to apply an enhancing electric field across the semiconductor substrate.

6. The neutron porosity measurement device of claim 1, wherein the electronics block is configured to transmit data related to a neutron porosity measurement to a remote device.

7. The neutron porosity measurement device of claim 1, wherein the electronics block is configured to operate at temperatures up to at least 250° C.

8. The neutron porosity measurement device of claim 1, wherein the semiconductor substrate includes trenches configured to receive the neutron reactive material.

9. The neutron porosity measurement device of claim 1, wherein the semiconductor substrate includes holes configured to receive pillars of the neutron reactive material.

10. The neutron porosity measurement device of claim 9, wherein the neutron reactive material is $^6$LiF.

11. The neutron porosity measurement device of claim 1, wherein the neutron reactive material comprises $^{10}$B.

12. The neutron porosity measurement device of claim 1, wherein the neutron reactive material comprises $^6$Li.

13. The neutron porosity measurement device of claim 1, wherein a thickness of the microstructures of neutron reactive material from the first surface inside the semiconductor substrate is between 50 μm and 200 μm.

14. The neutron porosity measurement device of claim 1, wherein the semiconductor substrate is silicon carbide.

15. The neutron porosity measurement device of claim 1, further comprising:
a chassis encapsulating the cavity, the first semiconductor detector and the second semiconductor detector, which are arranged coaxially.

16. The neutron porosity measurement device of claim 1, wherein the neutron absorber is boron epoxy.

17. A neutron porosity measurement tool, comprising:
a neutron source that emits neutrons;
a first semiconductor detector located at a first distance from the neutron source;
a second semiconductor detector located at a second distance larger than the first distance from the neutron source;
an electronics block configured to receive electrical signals from the first semiconductor detector and the second semiconductor detector; and
a chassis configured to accommodate the neutron source, the first semiconductor, the electronics block and the second semiconductor detector,
wherein each of the first and the second semiconductor detector includes
a semiconductor substrate doped to form a pn junction, and having microstructures of neutron reactive material formed to extend from a first surface inside the semiconductor substrate, and
electrodes, one of which is in contact with the first surface of the semiconductor substrate and another one of which is in contact with a second surface of the semiconductor substrate, the second surface being opposite to the first surface, the electrodes being configured to acquire and transmit to the electronics block, an electrical signal occurring when a neutron is captured in the semiconductor substrate,
wherein no high power source is included to provide an electric field across the first semiconductor detector and/or to the second semiconductor detector, a space between the first semiconductor detector and the second semiconductor detector, except for the electronics block, being filled with a neutron absorber.

18. A method of manufacturing a neutron porosity measurement device, comprising:
mounting a first semiconductor detector, an electronics block and a second semiconductor detector in this order along a chassis, above a cavity of the chassis configured to accommodate a neutron source; and
connecting the electronics block to pairs of electrodes of the first semiconductor detector and of the second semiconductor detector, to acquire electrical signals produced in the first semiconductor detector and in the second semiconductor detector when a neutron is captured therein.

19. The method of claim 18, further comprising at least one of:
attaching the chassis to a drill line;
filling a space between the first semiconductor detector and the second semiconductor detector, except for the electronics block, with a neutron absorber; and
mounting the neutron source inside the cavity.

20. The method of claim 19, wherein the neutron absorber is boron epoxy.

* * * * *